United States Patent Office 3,692,715
Patented Sept. 19, 1972

3,692,715
METAL SALT CATALYSTS FOR EPOXY-ANHYDRIDE RESIN SYSTEMS
Gaylord L. Groff, North St. Paul, Minn., and Ronald H. Williams, Hudson, Wis., assignors to Minnesota Mining and Manufacturing Company, St. Paul, Minn.
No Drawing. Filed May 1, 1970, Ser. No. 33,942
Int. Cl. C08g 51/74
U.S. Cl. 260—18 EP                                   6 Claims

ABSTRACT OF THE DISCLOSURE

The invention provides a heat-curable, one-part, catalyst-containing resin composition which remains as a liquid having a viscosity below 5,000 cps. at room temperature for at least three months and consists essentially of, (a) an epoxy resin selected from the group consisting of polyglycidyl ethers of polyhydric phenols and polyglycidyl esters of aromatic and cycloaliphatic polycarboxylic acids, said epoxy resin containing at least 1.5 oxirane groups per average molecular weight and having a viscosity of less than 30,000 cps. at 24° C.; (b) a dicarboxylic anhydride in an amount sufficient to provide about 0.5–1.2 anhydride groups per oxirane group; and (c) a catalyst comprising a metal-aliphatic carboxylic acid salt, the metal of which is selected from the group consisting of titanium, zirconium, hafnium, cerium and thorium and wherein the aliphatic acid component has from 3 to 18 carbon atoms; and wherein said composition is capable of being substantially completely cured at 155° C. within about eight hours.

This invention relates to a one-part, heat curable liquid epoxy-anhydride resin system which possesses low viscosity and long pot life.

BACKGROUND OF THE INVENTION

In the electrical industry it is necessary for some types of electrical components to be permanently insulated before they are later assembled. This is especially true in the high voltage motor field where the insulation must be very efficient and durable over a broad range of temperatures and voltages. To accomplish this, it is commonplace to provide a suitable insulation by wrapping the electrical conductors desired to be insulated with sheet mica insulation, or mica tape, and then impregnating the mica insulation with a curable liquid resin composition. In practice the electrical conductors, or coils and stators, which are desired to be insulated are wrapped with insulation and the insulation is then impregnated with resin by dipping or submerging the insulation wrapped electrical conductor in a large tank containing the liquid resin composition. The tank holding the resin may have a 5,000 gallon, or more, capacity. Suitable mica insulations, methods of preparing them, and resin impregnation are described in U.S. Pats. 3,026,222, 3,054,770, 2,757,298, and 3,369,947.

After the liquid resin has impregnated the wrapping insulation, the electrical conductor is removed from the tank and often is immediately covered with an impervious sheet material so that the impregnated liquid resin does not flow back out of the mica insulation or wrapping. The entire workpiece, i.e., electrical conductor with its resin impregnated mica insulation, is then heated to cure the resin composition.

The resin impregnation is usually carried out under a vacuum to avoid air pockets that would otherwise result in the insulation upon curing of the resin. It is also acceptable practice after release of the vacuum to apply a positive pressure to the tank during the impregnation step to assure penetration by the resin of the mica insulation as thoroughly as possible.

Since most of the electrical conductors to be insulated are very large in size, large impregnating tanks are required and the resin level in the tank is maintained fairly constant by periodic additions to replace resin used in the impregnation. Consequently, some of the liquid resin composition may remain in the tank for long periods of time.

Heretofore various liquid resin compositions have been used for impregnation of the mica insulation on electrical conductors. For example, various types of polyester resins, as described in U.S. Pats. 2,757,298 and 3,054,770, and epoxy resins, as described in U.S. Pats. 3,369,947 and 2,803,609, have been used for such applications. However, because of slow curing or high viscosity or for other reasons, there has not heretofore been a curable insulating resin system with desirable low viscosity, long pot life and fast cure properties.

The liquid resins of this invention are heat curable, one part, catalyst-containing epoxy resins which have a pot life of at least three months, and as long as six months. In addition to being stable over long periods of time, these new liquid epoxy resin compositions are stable through wide variations in temperature. The resins also have better electrical properties upon curing than do previously used epoxy resins for this purpose, more nearly approaching the excellent electrical properties of the polyesters without the high shrinkage, low mechanical strength, and high temperature problems of polyesters.

SUMMARY OF THE INVENTION

The invention provides a heat-curable, one-part, catalyst-containing resin composition which is particularly useful for vacuum impregnation of mica insulation located on electrical conductors such as coils and high-voltage windings. The resin composition of the invention remains as a liquid having a viscosity below 5,000 centipoises (cps.) for at least three months or longer at room temperature so that the composition may be used in large tanks for the submersion and consequent impregnation of mica insulation wrapped large motor coils and other electrical conductors. The low viscosity of the composition allows it to easily impregnate mica insulation up to 140 mils (about 3.5 mm.) thick. A latent, heat-activated metal salt catalyst is contained in the composition so that the composition does not advance prematurely, i.e., it remains liquid and usable at normal room temperatures for many months and remains usable at temperatures as high as 100° F. even after continuous exposure thereto for several weeks. An electrical conductor wrapped with mica insulation and impregnated with the composition of the invention cures within 4 to 8 hours upon heating it to 155° C.

The epoxy resins constitute a well known class of resinous materials containing the 1,2-epoxide

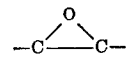

linkage. The epoxy resins are not self-hardening and so must be mixed with a chemical hardening agent. A well known class of hardening agents for epoxy resin is the polycarboxylic acid anhydrides. While these anhydrides are fairly effective for curing most solid epoxy resins, ther are ineffectual for most liquid epoxy resins. Consequently, it became common practice to use a catalyst to help promote the cure of epoxy-anhydride systems. A common class of catalysts which have been used for curing liquid epoxy-anhydride resins are the tertiary amines, e.g., those described in U.S. Pat. No. 3,052,650. Stannous salts have also been used for this purpose, e.g., U.S. Pat. No. 3,201,360. However, in none of these prior art systems has a low viscosity, long pot-life insulting resin system been shown. Various zinc salts have also been proposed, e.g., U.S. Pat. No. 3,364,159 and Canadian Pat. No. 835,484, but those catalysts are not sufficiently latent to provide a resin composition with a pot-life comparable to that obtained in accordance with this invention.

In accordance with the present invention, there is provided a heat-curable, catalyst-containing, one-part electrically insulating resin composition capable of remaining as a liquid having a viscosity below 5,000 cps. for at least three months at room temperature, said composition consisting essentially of, (a) an epoxy resin selected from the group consisting of polyglycidyl ethers of polyhydric phenols and polyglycidyl esters of aromatic and cycloaliphatic polycarboxylic acids, said epoxy resin containing at least 1.5, and preferably 2.0, oxirane groups per average molecular weight and having a viscosity of less than 30,000 cps. at 24° C., (b) a dicarboxylic anhydride in an amount sufficient to provide about 0.5–1.2 anhydride groups per oxirane group, which amount of anhydride dissolves in said epoxy resin to produce compositions which remain liquid at room temperature, and (c) a catalyst comprising an aliphatic carboxylic acid salt of a polyvalent metal selected from the group consisting of titanium, zirconium, hafnium, cerium and thorium, and wherein the aliphatic carboxylic acid component has from 3 to 18 carbon atoms, said catalyst being present in said epoxy resin in an amount sufficient to provide at least 0.1 part, and preferably not more than 2.0 parts, by weight of said metal per 100 parts by weight of said epoxy resin; wherein said composition is capable of being substantially completely cured at 155° C. within four to eight hours. For optimum curing and impregnating properties, it is desired to use an epoxy resin having about 1.5–2.0 oxirane groups per average molecular weight. While one may use epoxy resin with less than 1.5 oxirane groups per molecular weight, the slower reactivity of the epoxy resin would increase the cure time of the composition slightly and would slightly decrease the toughness of the cured resin. It is also possible to use an epoxy resin having more than 2.0 oxirane groups per molecular weight as long as the viscosity of the resulting composition is not above 5000 cps. The range of catalyst is about 0.1–2.0 parts by weight of metal per 100 parts by weight of epoxy resin. At concentrations of metal below 0.1 part, the curing of the composition is very slow, and at concentrations of metal above 2.0 parts, the curing rate is not significantly increased over that obtained with concentrations of metal slightly below 2.0 parts and it is not economically feasible to go much beyond this amount.

The advantages and a detailed description of the invention are more particularly set out by way of the following examples.

EXAMPLE I

A self-curing insulating resin composition was prepared which comprised, (a) 45.82 parts by weight of a diglycidyl ether of bisphenol A [bis(4-hydroxyphenyl) dimethylmethane], which has an average epoxy equivalent of 172–178, (b) 48.79 parts by weight of tetrapropenylsuccinic anhydride, and (c) 5.35 parts by weight of zirconium octoate solution (28% solution of zirconium octoate in mineral spirits). The amount of zirconium metal thus provided was 0.7% based upon the weight of epoxy resin. The ratio of epoxide equivalents to anhydride equivalents was 1.0 to 0.7. The solid zirconium octoate was dissolved in mineral spirits before being added to the epoxy-anhydride system so as to assure rapid compatability therein. The viscosity of the resulting composition was 600 cps. which increased to only 3,625 cps. after six months at room temperature. The gel time of this composition was 35 minutes at 155° C. The gel time is important because after the composition gels it cannot flow back out of the mica insulation which it impregnates. This composition was used to impregnate a thickness of 50 mils (about 1.3 mm.) of a mica tape which had been wrapped on each of several aluminum bars (½ inch by ¾ inch by 10 inches, which is about 12 mm. by 18 mm. by 250 mm.). The aforementioned mica tape consisted of a 4.5 mil (about 0.1 mm.) composite of mica paper bonded to a 1.5 mil (about 0.04 mm.) nonwoven polyester web, the web being bonded to the mica with the epoxy-polyester resin which is described in Example 2 of U.S. Pat. No. 3,027,279. The epoxy-polyester resin content of the mica tape was 8% by weight. The wrapped aluminum bars were heated at 130° C. for eight hours to remove moisture and then, after cooling to about 35° C., were placed in a vacuum chamber and subjected to a vacuum level of 2.0 mm. absolute of mercury for 30 minutes. Thereafter, while maintaining the vacuum in the chamber, sufficient insulating resin composition was conveyed there into to completely envelope the wrapped aluminum bars. The vacuum level of 2.0 mm. of mercury was then held for one hour followed by the application of a positive air pressure of 90 p.s.i. for two hours. The bars were then removed from the vacuum chamber and placed in PTFE-coated molds in order to size the insulation to 50 mils (about 1.3 mm.) thickness along the flat sides of the bar. The bars were then cured for eight hours at 155° C. whereby the resin cured to a hard, tough state which bonded the layers of mica tape together without any voids being present.

The resin composition of this example has also been used to impregnate mica tape wrapped to thicknesses of up to 140 mils (about 3.5 mm.) with ease.

The effectiveness of the resulting epoxy impregnated mica insulation was determined by a corona endurance test. That test comprising wrapping silicon steel band electrodes (12.5 mm. by 0.46 mm.) around each insulated test bar (i.e., a bar which has been wrapped with mica tape, then impregnated with a resin composition of the invention, and subsequently cured with heat) at five locations. High voltage leads are then applied to each of the band electrodes at a test frequency of 1440 Hertz with the test bar being grounded. Corona life data gathered at 145° C. and at a stress of 100 volts per mil (about 0.025 mm.) of the resin impregnated mica insulation of this example showed that the corona life exceeded 4150 actual hours at this accelerated frequency. On extrapolation this was approximately equivalent to a ten year operation at 60 cycles.

The dissipation factor of the resin impregnated mica insulation of this example was also measured. The dissipation factor is important because it is a measure of the amount of electrical power which may be lost through the insulation. Dissipation factor values gathered at 155° C. and 100 volts per mil remained below 0.08. Dissipation factor values comparable to those obtained with the resin compositions of the invention have not been achieved with prior art epoxy insulating resins.

The following examples have been prepared to illustrate variations in composition having suitable properties that fall within the scope of this invention.

EXAMPLE II

An electrically insulating resin composition was prepared using 35.30 parts by weight of an epoxy resin of a diglycidyl ester of terephthalic acid with an epoxide equivalent of about 155, 60.58 parts by weight of tetrapropenylsuccinic anhydride, and 4.12 parts by weight of zirconium octoate solution (28% solution of zirconium octoate in mineral spirits). The epoxide/anhydride equivalent ratio was 1/1, and 0.7% zirconium was provided based on the weight of epoxy. The resulting resin composition exhibited a viscosity of 250 cps. which increased to only 490 cps. after three months at room temperature. The gel time of the composition was 27.5 minutes at 150° C. The resin cured to a hard, tough state within four hours at 155° C. with a Shore D hardness of 80.

EXAMPLE III

An electrically insulating epoxy resin composition was prepared using, (a) 39.73 parts by weight of a liquid condensation product of epichlorohydrin and bisphenol A [bis(4-hydroxyphenyl)dimethylmethane], which has a viscosity of 10,000–16,000 cps. at 25° C. and an epoxide equivalent of about 190, (b) 55.62 parts by weight of tetrapropenylsuccinic anhydride, and (c) 4.64 parts by weight of zirconium octoate solution (28% solution of zirconium octoate in mineral spirits). The epoxide equivalent/anhydride equivalent ratio was 1/1. The amount of zirconium metal provided was 0.7% based on the weight of epoxy. This resin composition had an original viscosity of 800 cps. which increased to only 3360 cps. after three months at room temperature. The gel time of this composition at 150° C. was 87.4 minutes. This resin composition cured within four hours at 155° C. to a hard, tough state having a Shore D hardness of 70.

Typical anhydrides which may be used in the resin compositions of the invention are tetrapropenylsuccinic anhydride, hexahydrophthalic anhydride, nadic methyl anhydride, methyltetrahydrophthalic anhydride, myrcene-maleic anhydride adduct, and other liquid alkyl, alkenyl, cycloalkyl, and alkylene substituted anhydrides. The myrcene-maleic anhydride adduct may be prepared in the following manner. Maleic anhydride (34.6 parts by weight) is charged to a reaction vessel and heated to 65° C. Myrcene (64 parts by weight) is added slowly to the vessel, while maintaining the temperature of the reactants below 65° C., until all of the myrcene is added. After the addition of the myrcene is completed, the reaction vessel is heated to 95° C. for two hours. It is then permitted to cool to 65° C. at which temperature the pressure in the vessel is slowly reduced to 20–30 mm. of mercury, and the temperature raised to 150° C. When all of the distillate has been removed, the reaction vessel is cooled to 80° C. and the reaction product, myrcene-maleic anhydride adduct, is drained into a storage container.

The amount of anhydride used in the resin composition is not critical but generally an amount should be present sufficient to provide about 0.5–1.2 anhydride groups per oxirane group and such amount of anhydride should dissolve in the epoxy resin to produce compositions which remain liquid at room temperature. Preferably there are 0.7–0.8 anhydride groups per oxirane group so that the best balance of electrical properties, heat aging, viscosity and pot-life properties are obtained.

The following examples are illustrative of compositions using various anhydrides.

EXAMPLE IV

An insulating composition was prepared using 50.08 parts by weight of the diglycidyl ether of Example 1, 44.07 parts by weight of hexahydrophthalic anhydride, and 5.83 parts by weight of zirconium octoate solution (28% zirconium octoate in mineral spirits). The epoxide equivalent/anhydride equivalent ratio of 1/1, and the amount of zirconium provided was 0.7% based on the weight of epoxy. The initial viscosity of this composition was 500 cps. at room temperature and it increased to only 600 cps. after three months. The gel time was 35.9 minutes at 150° C. This composition cured to a hard, tough state within four hours at 155° C. and had a Shore D hardness of 78.

EXAMPLE V

An insulating composition was prepared using 46.87 parts by weight of the diglycidyl ether of Example 1, 47.67 parts by weight of nadic methyl anhydride, and 5.46 parts by weight of zirconium octoate solution (28% zirconium octoate in mineral spirits). The epoxide equivalent/anhydride equivalent ratio was 1/1, and the amount of zirconium metal provided was 0.7% based on the weight of epoxy. The initial viscosity of this composition was 670 cps. which increased to 1880 cps. after three months. The gel time was 56.4 minutes at 150° C. The composition cured to a hard, tough state within four hours at 155° C. and had a Shore D hardness of 73.

EXAMPLE VI

An insulating composition was prepared using 40.75 parts by weight of the diglycidyl ether of Example 1, 54.49 parts by weight of myrcene-maleic anhydride adduct, and 4.77 parts by weight of zirconium octoate solution (28% solids in mineral spirits). The epoxide/anhydride equivalent ratio was 1/1, and 0.7% zirconium was provided based on the weight of epoxy. The initial viscosity of this composition was 260 cps. at room temperature which viscosity increased to 1580 cps. after three months. This composition cured to a hard, tough state within four hours at 155° C. and had a Shore D hardness of 83. The gel time was 42 minutes at 150° C.

Various catalysts may also be used, of which the following examples are illustrative.

EXAMPLE VII

An insulating composition was prepared using 37.92 parts by weight of the diglycidyl ether of Example 1, 57.65 parts by weight of tetrapropenylsuccinic anhydride, and 4.42 parts by weight of zirconium neodecanoate solution (19% solids in mineral spirits). This composition had an initial viscosity of 440 cps. which viscosity increased to 1000 cps. after three months. This composition cured to a hard, tough state within four hours at 155° C. and had a Shore D hardness of 78. The gel time was 91.9 minutes at 150° C.

EXAMPLE VIII

An insulating composition was prepared using 38.17 parts by weight of the diglycidyl ether of Example 1, 58.01 parts by weight of cerium neodecanoate solution (27% solution of cerium neodecanoate in mineral spirits). The epoxide/anhydride equivalent ratio was 1/1, and 0.5% cerium was provided based on the weight of epoxy. This composition had an initial viscosity of 520 cps. which increased to 2720 cps. after three months. This composition cured to a hard, tough state within four hours at 155° C. and had a Shore D hardness of 82. The gel time at 150° C. was 60 minutes.

It is also possible to use other cerium and zirconium salts of aliphatic carboxylic acids containing from 3 to 18 carbon atoms. In similar fashion, the aliphatic carboxylic acid salts of titanium, hafnium and thorium are also useful in the practice of the invention.

EXAMPLE IX

A resin composition was prepared using 47.27 parts by weight of the diglycidyl ether of Example 1, 50.30 parts by weight of tetrapropenylsuccinic anhydride, and 2.43 parts by weight of titanium neodecanoate solution (90.6% solids in mineral spirits). The epoxide/anhydride equivalent ratio was 1/0.7, and the amount of titanium provided was 0.5% based on the weight of epoxy resin. This composition had an initial viscosity of 1000 cps. The gel time was 35 minutes at 155° C. This composition cured to a hard, tough state within four hours at 155° C. and had a Shore C hardness of 88.

In order to obtain satisfactory curing and the desired pot-life of the insulating compositions, it is necessary for the catalyst to be present, either by dissolving or by remaining suspended, in the epoxy resin in an amount sufficient to provide at least 0.1 part by weight of metal per 100 parts by weight of epoxy resin, although 0.5–1.0 part by weight of metal per 100 parts by weight of epoxy resin is preferred. It is often desirable to dissolve the metal catalyst in a small amount of solvent, e.g., in mineral spirits, before adding it to the epoxy resin so that rapid compatability will be assured. If the metal catalyst is not sufficiently soluble or suspendable in the epoxy resin, it will settle out with the passage of time and thereby shorten the usable life of the composition.

Several other resin compositions have been prepared using a 1/0.7 equivalent ratio of epoxide/anhydride and from 0.1%–0.3% by weight of zirconium metal (from zirconium octoate) based on the weight of epoxy resin. Those compositions had gel times ranging from 210 minutes to 330 minutes at 155° C. and cured to a hard, tough state within eight hours at 155° C. Those compositions had considerably shorter gel and cure times when tested at 180° C.

The following table shows a comparison of viscosity, during heat aging, of a resin composition catalyzed with various prior art catalysts and a catalyst of the invention.

| Epoxide/anhydride [1] equivalent ratio | Catalyst/percent based on weight of epoxy [2] | Initial | Viscosity (cps.) (measured at 23° C.) | | |
|---|---|---|---|---|---|
| | | | 1 week at 100° F. | 2 weeks at 100° F. | 3 weeks at 100° F. |
| 1.0/0.7 | Zinc octoate/0.2% | 1,200 | 2,840 | 12,800 | 17,600 |
| 1.0/0.7 | Zinc naphthanate/0.2% | 1,140 | 2,440 | 6,800 | 8,100 |
| 1.0/0.7 | Zinc naphthanate/0.2% | [3] 645 | 1,960 | 9,800 | 13,600 |
| 1.0/0.7 | Zirconium octoate/0.7% | 550 | 1,030 | 2,240 | 3,300 |

[1] The epoxy used was the diglycidyl ether of Example 1 and the anhydride was tetrapropenylsuccinic anhydride.
[2] Percent metal.
[3] The initial viscosity was reduced to this value with mineral spirits.

As the table shows, the prior art catalysts do not provide the long pot-life and low viscosity which are obtained with the catalysts used in the practice of this invention.

To obtain lower viscosity in the insulating composition and greater flexibility of cured product, at some expense in toughness, monoepoxides may be included in amounts up to about 20% by weight of the polyglycidyl ether or ester, but not in such large amounts that the composition does not readily cure to a tough, essentially infusible, insoluble state. Typical useful monoepoxides are dodecene oxide, octylene oxide, dipentene monoxide, alpha-pinene oxide, styrene oxide, phenyl glycidyl ether, vinylcyclohexenemonoxide, and epoxidized long-chain olefins, e.g., of 16–18 carbon atoms. Small amounts of aliphatic diepoxides, e.g., polypropylene oxide diglycidyl ether or the diglycidyl ester of dimer acids, are also useful as diluents and flexibilizers.

The compositions of the invention may also be used for encapsulating electrical coils and other electrical apparatus. For casting operations it is sometimes desirable to use fillers to increase the internal strength of the cured resin composition.

What is claimed is:
1. A heat-curable, one-part, catalyst-containing epoxy resin composition capable of remaining as a liquid having a viscosity below 5,000 cps. for at least three months at room temperature, said composition consisting essentially of
  (a) an epoxy resin selected from the group consisting of polyglycidyl ethers of polyhydric phenols and polyglycidyl esters of aromatic and cycloaliphatic polycarboxylic acids, said epoxy resin containing at least 1.5 oxirane groups per average molecular weight and having a viscosity of less than 30,000 cps. at 24° C.;
  (b) a dicarboxylic anhydride compatible with said epoxy resin in an amount sufficient to provide about 0.5–1.2 anhydride groups per oxirane group; and
  (c) a catalyst comprising an aliphatic carboxylic acid salt of a polyvalent metal selected from the group consisting of titanium, zirconium, hafnium, cerium, and thorium, and wherein the aliphatic carboxylic acid component has from 3 to 18 carbon atoms, said catalyst being present in said epoxy resin in an amount sufficient to provide at least 0.1 part by weight of said metal per 100 parts by weight of said epoxy resin, wherein said composition is capable of being substantially completely cured at 155° C. without about eight hours.

2. A heat-curable, one-part, catalyst containing resin composition in accordance with claim 1, wherein said epoxy resin is a polyglycidyl ether of a polyhydric phenol.

3. A heat-curable, one-part, catalyst-containing resin composition in accordance with claim 2 wherein said catalyst is selected from the group consisting of titanium neodecanoate, zirconium octoate, zirconium neodecanoate and cerium neodecanoate.

4. A heat-curable, one-part, catalyst-containing resin composition in accordance with claim 1, wherein said epoxy resin is the diglycidyl ether of bis(4-hydroxyphenyl) dimethylmethane; wherein said anhydride is selected from the group consisting of tetrapropenylsuccinic anhydride, hexahydrophthalic anhydride, nadic methyl anhydride, and myrcene-maleic anhydride adduct, said anhydride being present in an amount sufficient to provide about 0.5–1.2 anhydride groups per oxirane group; and wherein said catalyst is selected from the group consisting of titanium neodecanoate, zirconium octoate, zirconium neodecanoate and cerium neodecanoate.

5. A heat-curable, one-part, catalyst-containing resin composition in accordance with claim 4, wherein said anhydride is tetrapropenylsuccinic anhydride and wherein said catalyst is selected from the group consisting of zirconium octoate, zirconium neodecanoate, and cerium neodecanoate.

6. A heat-curable, one-part, catalyst-containing resin composition in accordance with claim 5, wherein said tetrapropenylsuccinic anhydride is present in an amount sufficient to provide about 0.7 anhydride groups per oxirane group and wherein said catalyst is zirconium octoate and is present in an amount sufficient to provide from about 0.5–1.0 part by weight of zirconium metal per 100 parts by weight of said epoxy resin.

References Cited
UNITED STATES PATENTS

| 3,385,835 | 5/1968 | Kugler et al. | 260—78.4 EP |
| 3,487,027 | 12/1969 | Case | 260—18 EP |
| 2,803,609 | 8/1957 | Schlenker | 260—47 EP |
| 3,450,647 | 6/1969 | Gunther et al. | 260—2 EP |

WILLIAM H. SHORT, Primary Examiner

T. E. PERTILLA, Assistant Examiner

U.S. Cl. X.R.

117—127, 161 ZB; 161—207; 260—2 EC, 30.4 EP, 47 EC, 78.4 EP